Patented Feb. 20, 1923.

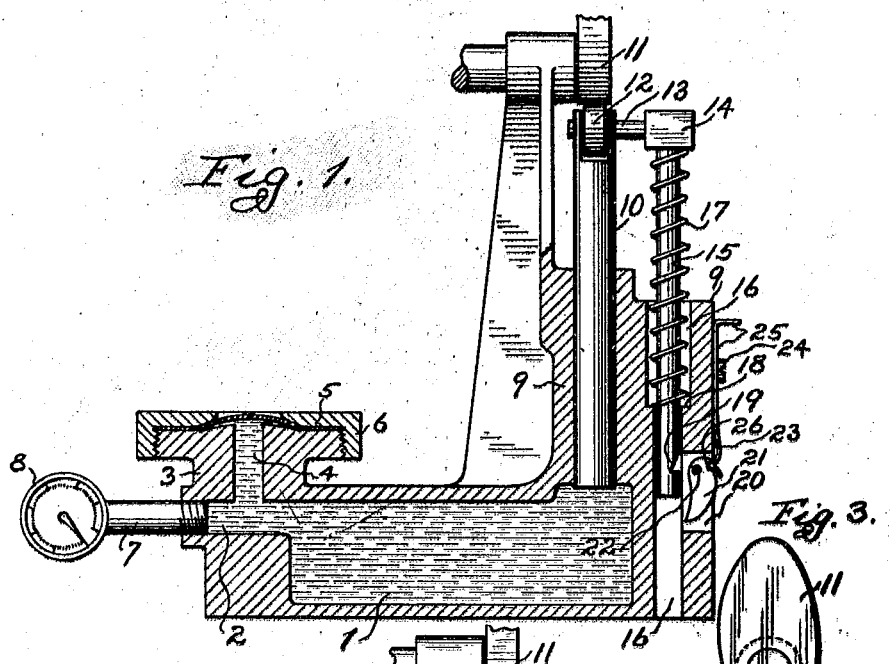
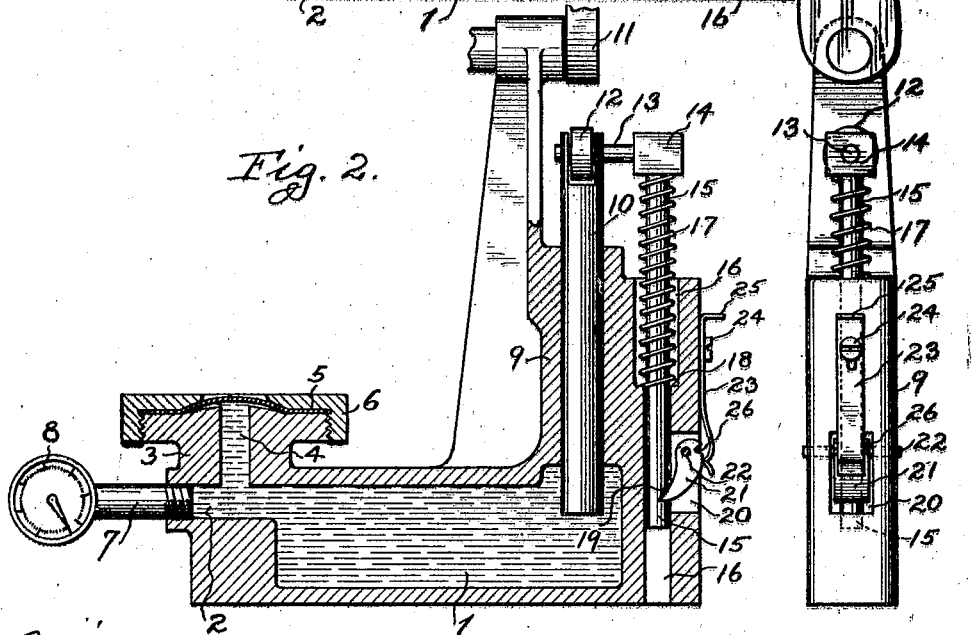

1,445,964

UNITED STATES PATENT OFFICE.

WILLIAM D. LA BATT AND HANS SENGEBUSCH, OF CHICAGO, ILLINOIS, ASSIGNORS TO ELISHA J. CADY, OF OAK PARK, ILLINOIS.

PLUNGER MECHANISM FOR TESTING MACHINES.

Application filed November 18, 1921. Serial No. 516,032.

*To all whom it may concern:*

Be it known that we, WILLIAM D. LA BATT and HANS SENGEBUSCH, citizens of the United States, residing at Chicago, in the county of Cook and State of Illinois, having jointly invented certain new and useful Improvements in Plunger Mechanism for Testing Machines, do hereby declare that the following is a full, clear, and exact description of the same, reference being had to the accompanying drawings.

The invention relates to machines for testing fabrics, such as paper and paper board, and its object is to provide means for governing the length of stroke of the plunger by which the liquid is compressed against the elastic diaphragm which transmits the pressure to the stock being tested.

In machines of the type in which the strain of a body of liquid under pressure by a plunger is exerted against an elastic diaphragm transmitting the pressure in a transverse direction against a confined section or area of the stock it is desirable and advantageous to give the plunger a relatively long travel or stroke when testing spongy fabrics, such as cellular and multiple ply paper board, and a relatively short stroke when testing solids, such as ordinary paper board. Our invention consists in the matters hereinafter described and then pointed out in the appended claims by which these results are attained in the same machine so that one machine accomplishes two lines of work.

In the accompanying drawings Fig. 1 is a view partly in section and partly in elevation of a testing machine equipped with our invention, the parts being arranged to give a maximum stroke to the plunger; Fig. 2 is a similar view with the parts arranged to give the mimimum stroke to the plunger, and Fig. 3 is a detail view.

In the drawings the reference numeral 1 represents the liquid chamber of the machine, and 2 a cylinder communicating with the chamber in any suitable manner and centrally bored throughout its length, with an upturned vertical branch 3 having a central open passage 4 which is closed by the diaphragm 5 of elastic material held thereon by a threaded cap 6 which also forms a stock-supporting platform, the cap being provided with a central opening in line with the bore of the branch 3 and having a bell-mouth somewhat larger than the bore. The liquid chamber also receives a pipe 7 in extension of its interior and communicating with an indicating and registering gage 8 subject to and operated by the pressure of the liquid in the chamber and indicating the pressure by its pointer on its dial in pounds and fractions thereof in the usual manner. One of the walls of the chamber is provided with a bearing 9 having a bore in which the pressure-producing plunger 10 reciprocates, the lower end of the plunger entering the liquid in the chamber and its upper end being in the path of a spiral cam 11. The upper end of the plunger is provided with an anti-friction roller 12 whose shaft 13 is laterally extended at one side to form an arm which carries at its outer end a head 14 supporting a slide rod 15 disposed parallel with the plunger and reciprocating in a well or bore 16 in the bearing 9 adjacent the bore for the plunger. A coiled spring 17 surrounds the rod and reacts between the head 14 and a shoulder 18 near the lower end of the well 16 when it is put under compression by the downward stroke of the plunger. The slide rod 15 is provided near its lower end with a notch 19 which registers with an opening 20 in the wall of the bearing 9, and a pawl 21 is pivotally mounted at 22 in the opening 20 in such position that when it hangs by gravity it is located entirely in the opening and its free end does not lie against the rod or enter the notch 19 as shown in Fig. 1. A spring-arm 23 is slidably mounted on a screw 24 on the side of the bearing 9 above the opening 20, and its lower end is curved to enter the opening and bear upon the pawl, the arm being provided with a handle 25 to move it up and down to cause the pawl to lie either engaged or disengaged with the notch in the slide rod 15 as it travels with the pressure plunger. The pawl is preferably provided with an upper notch 26 in which the end of the arm 23 engages when the latter is raised and locks the pawl out of the path of the slide-rod as shown in Fig. 1, and the pawl is also provided with a cam-face 27 below the notch with which the end of the arm 23 engages when the latter is lowered and holds the pawl in the notch of the slide-rod. The spring holds the pawl engaged or disengaged with the slide-rod.

When the parts are arranged as shown in Fig. 1 the spring 17 retracts the plunger to position for a full or maximum stroke and holds it normally against the lower surface of the spiral cam and with its lower end withdrawn from the liquid in the chamber, so that upon actuation of the cam the plunger makes its full or maximum stroke. When the parts are arranged as shown in Figs. 2 and 3 the spring retracts the plunger until the pawl engages its notch to hold it in position for a partial or minimum stroke, its lower end then being partly in the liquid and its upper end being normally out of contact with the lower surface of the spiral cam but adapted to be operated by the rise thereof. By this construction the plunger 10 is given either a maximum stroke as in Fig. 1, or a minimum stroke as in Fig. 2. In the former case the long stroke of the plunger enables the machine to make both the crushing test and the pop or rupture test on spongy materials, such as multiple ply paper board, and in the latter case its short stroke is sufficient to make the pop or rupture test on solids such as ordinary paper board.

We claim:

1. In a testing machine, a liquid chamber having an aperture, an expansible diaphragm closing the aperture, a plunger constructed to reciprocate in the chamber, means to retract the plunger for its maximum stroke, means to limit the retraction of the plunger for its minimum stroke, and means to operate the plunger to impart pressure to the liquid in both its retracted positions.

2. In a testing machine, a liquid chamber having an aperture, an expansible diaphragm closing the aperture, a spring-retracted plunger constructed to reciprocate in the chamber, means to control the extent of retraction of the plunger, and means to operate the plunger against its spring to impart pressure to the liquid.

3. In a testing machine, a liquid chamber having an aperture, an expansible diaphragm closing the aperture, a spring-retracted plunger constructed to reciprocate in the chamber, pawl mechanism to control the extent of retraction of the plunger, and means to operate the plunger against its spring to impart pressure to the liquid.

4. In a testing machine, a liquid chamber having an aperture, an expansible diaphragm closing the aperture, a spring-retracted plunger constructed to reciprocate in the chamber, a spring-controlled pawl to control the extent of retraction of the plunger, and means to operate the plunger against its spring to impart pressure to the liquid.

5. In a testing machine, a liquid chamber having an aperture, an expansible diaphragm closing the aperture, a bearing having a parallel well and bore, a plunger in the bore, a rod connected to the plunger and reciprocating in the well, a spiral spring reacting between the rod and well to retract the plunger in its bore, a notch in the rod, a pawl constructed to engage and disengage the notch, and means constructed to actuate the plunger to impart pressure to the liquid in either position of the pawl.

6. In a testing machine, a liquid chamber having an aperture, an expansible diaphragm closing the aperture, a bearing having a well and bore, a plunger in the bore, a rod connected to the plunger and reciprocating in the well, a spiral spring re-acting between the rod and well to retract the plunger in its bore, a notch in the rod, a pawl constructed to engage and disengage the notch, and a spiral cam constructed to actuate the plunger to impart pressure to the liquid in either position of the pawl.

7. In a testing machine, a liquid chamber having an aperture, an expansible diaphragm closing the aperture, a bearing having a parallel well and bore, a plunger in the bore, a rod connected to the plunger and reciprocating in the well, a spiral spring reacting between the rod and well to retract the plunger in its bore, a notch in the rod, a spring-pressed pawl constructed to engage and disengage the notch, and a spiral cam constructed to actuate the plunger to impart pressure to the liquid in either position of the pawl.

8. In a testing machine, a liquid chamber having an aperture, an expansible diaphragm closing the aperture, a bearing having a parallel well and bore, a plunger in the bore, a rod connected to the plunger and reciprocating in the well, a spiral spring reacting between the rod and well to retract the plunger in its bore, a notch in the rod, a pawl constructed to engage and disengage the notch, a sliding spring constructed to hold the pawl in either of said positions, and means constructed to actuate the plunger in either position of the pawl to impart pressure to the liquid.

In testimony whereof we affix our signatures.

WILLIAM D. LA BATT.
HANS SENGEBUSCH.